(12) United States Patent
Minnich et al.

(10) Patent No.: US 10,070,585 B2
(45) Date of Patent: Sep. 11, 2018

(54) AIR SYSTEM FOR AN AGRICULTURAL HARVESTER

(71) Applicant: CNH Industrial America LLC, New Holland, PA (US)

(72) Inventors: Michael John Minnich, Elizabethtown, PA (US); Robert D. Crandall, Lancaster, PA (US); Timothy Alan Meeks, Donahue, IA (US); Arlan Davis, Sylvester, GA (US); Jeffrey Mark Norton, Lebanon, PA (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 15/310,674

(22) PCT Filed: May 14, 2015

(86) PCT No.: PCT/US2015/030839
§ 371 (c)(1),
(2) Date: Nov. 11, 2016

(87) PCT Pub. No.: WO2015/175811
PCT Pub. Date: Nov. 19, 2015

(65) Prior Publication Data
US 2017/0071129 A1 Mar. 16, 2017

Related U.S. Application Data

(60) Provisional application No. 61/993,885, filed on May 15, 2014.

(51) Int. Cl.
*A01D 46/00* (2006.01)
*A01D 46/10* (2006.01)
*A01D 46/12* (2006.01)

(52) U.S. Cl.
CPC ............. *A01D 46/10* (2013.01); *A01D 46/12* (2013.01)

(58) Field of Classification Search
CPC ........ A01D 46/08; A01D 46/10; A01D 46/14; A01D 46/12
USPC ............................... 56/13.3, 30–32, 41, 13.1
See application file for complete search history.

(56) References Cited

U.S. PATENT DOCUMENTS

| | | | |
|---|---|---|---|
| 3,401,510 A | 9/1968 | Hubbard | |
| 3,487,450 A | 12/1969 | Hubbard | |
| 4,271,659 A | 6/1981 | McConnell | |
| 4,501,112 A | 2/1985 | Thedford et al. | |

(Continued)

*Primary Examiner* — Robert E Pezzuto
(74) *Attorney, Agent, or Firm* — Patrick M. Sheldrake

(57) ABSTRACT

An air system (50) for an agricultural harvester (10) includes an air flow splitter component (52) configured to be coupled to the agricultural harvester (10). The air flow splitter component (52) has an inlet (56) configured to receive air and a plurality of air outlets (58) configured to distribute the air. The air system also includes a plurality of air flow paths (60). Each air flow path of the plurality of air flow paths extends from a respective one of the plurality of air outlets and is configured to extend to a corresponding drum (12) of the agricultural harvester. Additionally, each air flow path includes a discharge outlet (80) that is configured to be disposed between a bottom surface (81) of the corresponding drum (12) and a bottom disc (85) of a doffer (42) of the corresponding drum (12) while the air system (50) is coupled to the agricultural harvester.

20 Claims, 4 Drawing Sheets

(56) References Cited

U.S. PATENT DOCUMENTS

| | | | |
|---|---|---|---|
| 4,660,359 A | 4/1987 | Deutsch | |
| 4,821,497 A * | 4/1989 | Deutsch | A01D 46/14 56/30 |
| 4,928,459 A | 5/1990 | Thedford et al. | |
| 6,907,718 B2 | 6/2005 | Haverdink | |
| 7,168,228 B2 | 1/2007 | Lukac et al. | |
| 7,743,593 B2 * | 6/2010 | Owen | A01D 46/10 56/30 |

* cited by examiner

AIR SYSTEM FOR AN AGRICULTURAL HARVESTER

CROSS REFERENCE TO RELATED APPLICATION

This application claims priority from and the benefit of U.S. Provisional Application Ser. No. 61/993,885, entitled "AIR SYSTEM FOR AN AGRICULTURAL HARVESTER," filed May 15, 2014, which is hereby incorporated by reference in its entirety.

BACKGROUND

The invention relates generally to ground working equipment, such as agricultural equipment, and more specifically, to an air system for an agricultural harvester.

Generally, harvesters include multiple drums distributed across a width of the harvester. Each drum is configured to harvest crops along a row as the harvester proceeds across a field. For example, a drum of a cotton harvester may include a rotor with spindles that revolve about the rotor to remove cotton bolls from cotton plants. The harvested goods and other agricultural materials (e.g., chaff, foliage) may be directed through outlets to a bin, baler, or to the field. Unfortunately, during processing, the agricultural product may accrete (e.g., wind or accumulate) about the components of the harvester, particularly when the agricultural product has a high moisture content and/or when a large volume of agricultural product is processed by the harvester. Thus, a harvesting period may be limited to certain hours of the day when the humidity and/or moisture of the crop are relatively low, for example. Furthermore, the harvesting capacity of the harvester may be limited.

BRIEF DESCRIPTION

In one embodiment, an air system for an agricultural harvester includes an air flow splitter component that is configured to be coupled to the agricultural harvester. The air flow splitter component has an inlet configured to receive air and a plurality of air outlets configured to distribute the air. The air system also includes a plurality of air flow paths. Each air flow path of the plurality of air flow paths extends from a respective one of the plurality of air outlets and is configured to extend to a corresponding drum of the agricultural harvester. Additionally, each air flow path of the plurality of air flow paths includes a discharge outlet that is configured to be disposed between a bottom surface of the corresponding drum and a bottom disc of a doffer of the corresponding drum while the air system is coupled to the agricultural harvester.

In one embodiment, an air system for an agricultural harvester includes an air flow splitter component that is configured to be coupled to the agricultural harvester. The air flow splitter component has an inlet configured to receive air and a plurality of air outlets configured to distribute the air. The air system also includes a plurality of air flow paths. Each air flow path of the plurality of air flow paths extends from a respective one of the plurality of air outlets. Additionally, the plurality of air flow paths is configured to distribute the air to a first drum and to a second drum of the agricultural harvester.

In one embodiment, an agricultural harvester includes at least one drum configured to receive and to process a crop as the agricultural harvester travels across a field. The agricultural harvester also includes an air system coupled to the at least one drum. The air system includes an air flow splitter component having an inlet configured to receive air and a plurality of air outlets configured to distribute the air. The air system also includes a plurality of air flow paths. At least one air flow path of the plurality of air flow paths extends from a respective one of the plurality of air outlets to the at least one drum. Additionally, the at least one air flow path of the plurality of air flow paths is configured to discharge the air under a doffer of the at least one drum.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
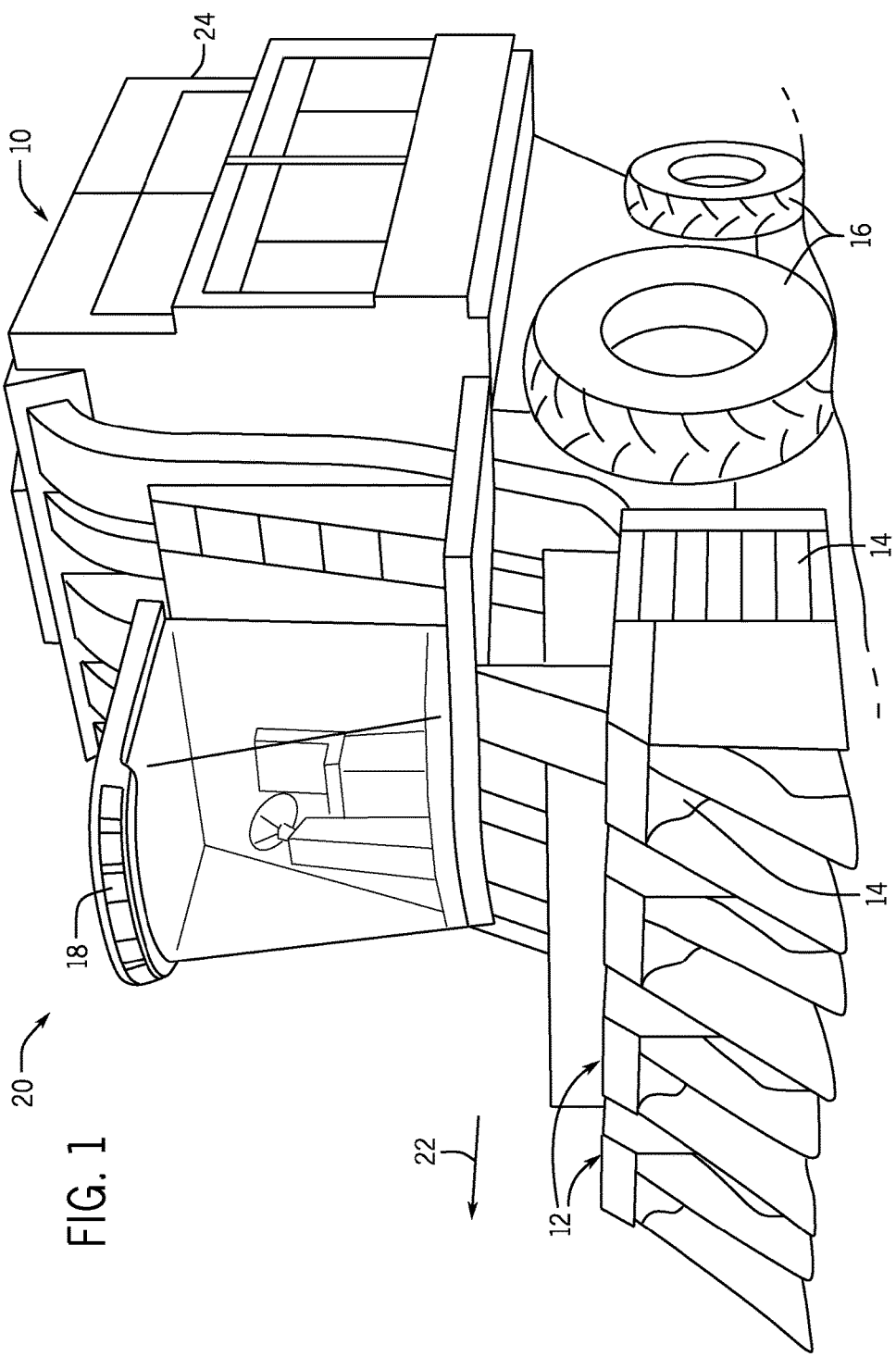
FIG. 1 is a perspective view of an embodiment of a harvester configured to harvest rows of a crop.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A harvester removes portions of a crop for processing as agricultural product, and separates portions of the agricultural product into harvested goods (e.g., cotton) and other agricultural materials (e.g., chaff, foliage). The harvested goods and the other agricultural materials are discharged into outlets, such as a harvested goods outlet and a discharge outlet, respectively. The embodiments disclosed herein include an air system that supplies an air flow to reduce accretion of the harvested goods within the harvester, and to effectively and efficiently convey the harvested goods toward the harvested goods outlet. In some cases, certain features of the disclosed air system may facilitate conveyance of harvested goods having a relatively high moisture content, which may in turn, extend the harvest period by enabling harvesting of the crops in the mornings and/or in the evenings when moisture (e.g., dew) may accumulate on the crops. Furthermore, certain features of the disclosed air system may enable higher harvesting capacity and/or increased output of the harvested goods.

In certain embodiments, by providing multiple air flow paths with respective air discharge outlets positioned on laterally opposite sides of a drum and/or by providing multiple air flow paths with respective air discharge outlets configured to direct the air flow under doffer stacks of the harvester, the air system may reduce accretion within the harvester, thereby enabling higher harvesting capacity and/or conveyance of higher moisture agricultural products. Furthermore, in certain embodiments, the air system may include one or more flow splitter components, and each of the flow splitter components may supply air to multiple drums via multiple air flow paths, thereby facilitating efficient distribution of the air flow through the harvester while reducing parts and/or cost. Moreover, in some cases, the air flow system or certain components (e.g., the air flow paths, hoses, and/or posts) of the air flow system may be configured to be removably coupled to the harvester (e.g., physically separable from a frame of the harvester) to facilitate inspection, cleaning, repair, and/or replacement of air supply conduits, for example.

Turning now to the drawings, FIG. 1 is a perspective view of an embodiment of a harvester 10 configured to harvest rows of a crop. The harvester 10 includes drums 12 (e.g., harvesting heads) that utilize an air system to facilitate flow of harvested goods (e.g., cotton) through the harvester 10. The harvester 10 may harvest crops with one or more rotors 14 in each drum 12. In some embodiments, the harvester 10 may be self-propelled and may move the drums 12 through a field using wheels 16 or tracks. In some embodiments, the drums 12 are part of an implement driven through the field by a prime mover (e.g., tractor). A cab 18 may include an interface with controls for operating the harvester 10 and for monitoring the harvesting process.

The drums 12 extend across the harvester 10 and remove portions of the crops of each row as the harvester 10 travels in a direction 22 across the field. The drums 12 facilitate transfer of the harvested goods to a bin 24, basket, or baler positioned behind the drums 12. Other agricultural materials (e.g., foliage, stems, debris, detritus) may be deposited onto the field beneath and/or behind the harvester 10. As discussed herein, the term bin 24 may include, but is not limited to, a basket, baler, reservoir, or receptacle to receive the harvested goods. The bin 24 may be a part of the harvester 10, a part of a separate implement, or another vehicle. Although four drums 12 are shown in FIG. 1, it should be understood that the harvester 10 may have any suitable number of drums 12, such as 1, 2, 3, 4, 5, 6, 7, 8, 9, 10, or more drums 12.

Figure 2:
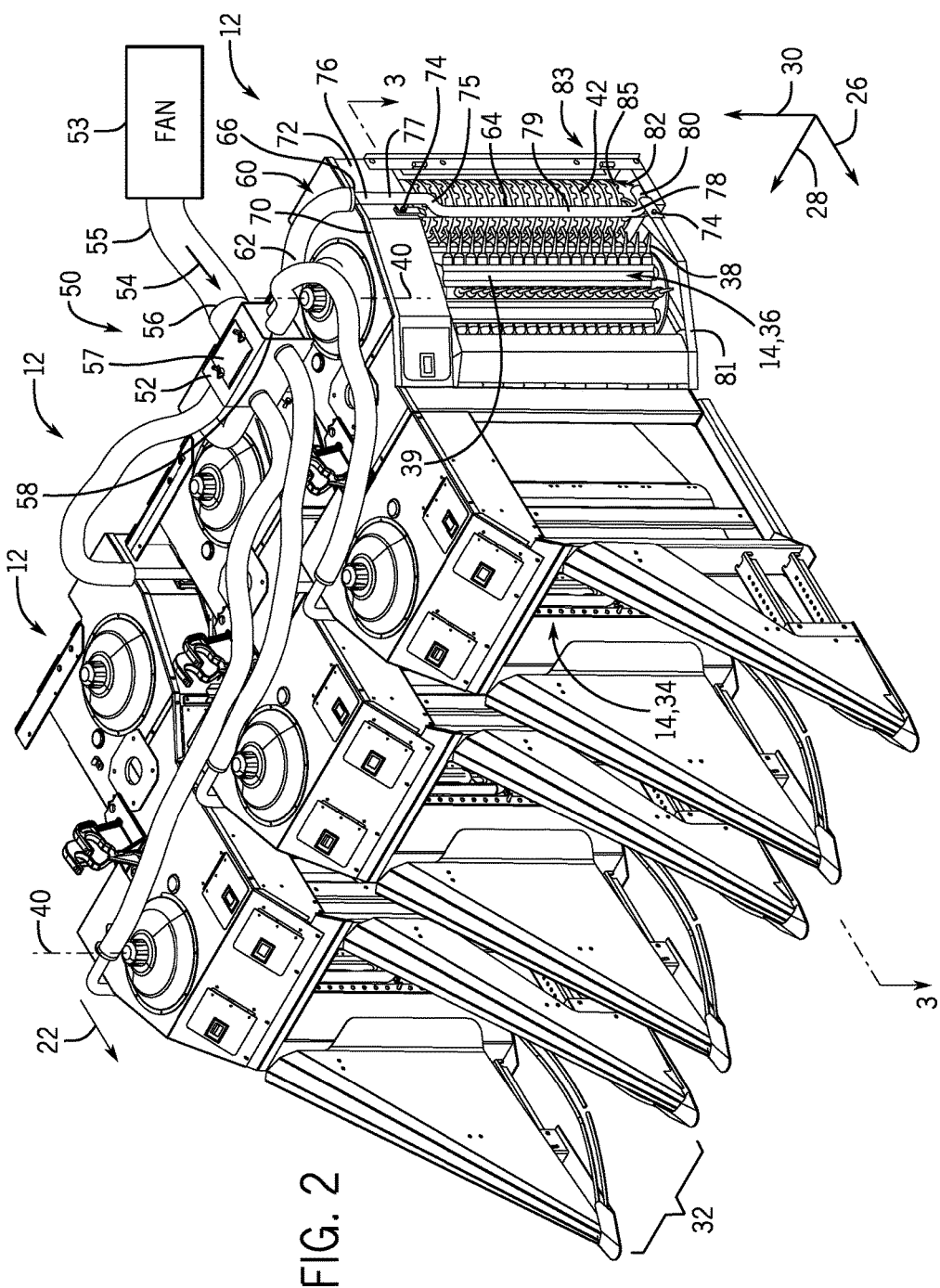
FIG. 2 is a perspective view of an embodiment of multiple drums of a harvester.

FIG. 2 is a perspective view of an embodiment of multiple drums 12 of the harvester 10. The internal components of one drum 12 of the multiple drums 12 is shown to facilitate discussion, although it should be understood that the other drums 12 may have similar components and features. The drums 12 may be described with reference to an axial axis or direction 26, a lateral axis or direction 28, and a vertical axis or direction 30. As the harvester 10 moves in the direction of travel 22, crops enter a crop passage 32 of each drum 12. In some embodiments, each drum 12 has a front rotor 34 and a rear rotor 36 that are on opposite lateral sides of the crop passage 32. Although in some cases, the front rotor 34 and the rear rotor 36 may be on the same side of the crop passage 32. Spindles 38 on spindle bars 39 rotate about a rotational axis 40 (e.g., along a cam path) of each of the rotors 14 (e.g., the front rotor 34 and the rear rotor 36) to remove portions of the crops. Doffers 42 transfer the harvested goods from each of the rotors 14 toward the bin 24. Each spindle bar 39 may have a column of spindles 38 along the rotational axis 40. For example, each spindle bar 39 may have approximately 5 to 50, approximately 10 to 40, or approximately 15 to 30 spindles 38.

As shown, an air system 50 is provided to facilitate flow of the harvested goods through the harvester 10. As discussed above, the air system 50 disclosed herein may reduce accretion of the harvested goods within the harvester 10, enable higher harvesting capacity, and/or facilitate conveyance of high moisture harvested goods toward the bin 24. The air system 50 includes a flow splitter component 52 that receives air 54 through an air inlet 56. A fan 53 may direct the air 54 to the air inlet 56 via an air passageway 55. The flow splitter component 52 includes multiple air outlets 58. As shown, the flow splitter component 52 includes six air outlets 58, although any suitable number (e.g., 1, 2, 3, 4, 5, 6, 7, 8, 9, 10, or more) of air outlets 58 may be provided. The flow splitter component 52 may include a latched door 57 that can be opened to facilitate inspection, cleaning, and/or maintenance of the flow splitter component 52. As shown, the flow splitter component 52 is disposed on a top surface 59 of the drum 12, although the flow splitter component 52 may be positioned in any suitable location to facilitate flow of the air 54 to the drums 12.

Multiple air flow paths 60 extend from the air outlets 58 of the flow splitter component 52 to direct the air 54 into the drums 12. Each air flow path 60 includes a hose 62 (e.g., a first conduit) and a post 64 (e.g., a second conduit) coupled to one another, such as via a threaded coupling 66. The hoses 62 may be flexible and/or resilient (e.g., formed from natural or synthetic rubber) such that the hoses 62 can be easily routed around structures on the top surfaces 59 of the drums 12. The posts 64 may be rigid (e.g., formed from metal or metal alloy, such as steel) to facilitate coupling the posts 64 to the drums 12 and/or to facilitate directing the air 54 into the drums 12.

As shown, each hose 62 generally extends from a respective one of the air outlets 58 along the top surface 59 of the drum 12 and connects to a respective one of the posts 64 proximate to an edge 70 of the top surface 59 of a respective one of the drums 12. In the illustrated embodiment, each one of the posts 64 is coupled to a frame 72 of the drum 12 by two threaded fasteners 74 (e.g., bolts), one positioned proximate to a first end 76 of the post 64 and one positioned proximate to a second end 78 of the post 64. In such cases, the posts 64 may be easily removed from the drum 12 by unthreading the threaded fasteners 74. Such a configuration may facilitate inspection, cleaning, maintenance, and/or replacement of the posts 64. Any suitable number (e.g., 1, 2, 3, 4, 5, 6, 7, 8, 9, 10, or more) of the threaded members 74 may be utilized to couple the post 64 to the frame 72 of the drum 12. In certain embodiments, each of the posts 64 may have a bend 75 (e.g., a lateral bend) proximate to the first end 76 of the post 64. Thus, a first portion 77 of the post 64 may be disposed externally to the drum 12, while a second portion 79 of the post 64 may be disposed internally to the drum 12. Such a configuration may enable the post 64 to be easily coupled to and/or removed from the frame 72 of the drum 12, while also enabling the post 64 to direct the air 54 to the drum 12.

As shown, an air discharge outlet 80 extends from the second end 78 of the post 64. The air discharge outlet 80 may be generally orthogonal to the post 64 and/or may be generally parallel to a bottom surface 81 of the drum 12. The air discharge outlet 80 is oriented toward a harvested goods outlet 83 of the drum 12 and/or is disposed below a bottom disc 85 of the doffer 42 (e.g., disposed between the bottom surface 81 of the drum 12 and the bottom disc 85 of the doffer 42 along the vertical axis 30 of the drum 12). Thus, the air discharge outlet 80 may generally discharge the air 54 toward the harvested goods outlet 83 of the drum 12, as shown by arrow 82, and/or below the bottom disc 85 of the doffer 42. As a result, accumulation of the harvested goods under the doffer 42 may be substantially reduced and/or transfer of the harvested goods toward the bin 24 (shown in FIG. 1) may be facilitated. The air discharge outlet 80 may be integrally, continuously, and gaplessly formed with the post 64 from a single material, or the air discharge outlet 80 may be a separate component of the air flow path 60 that is coupled to the post 64 via any suitable techniques.

In the disclosed embodiments, the flow splitter component 52 distributes the air 54 through multiple air outlets 58 into multiple air flow paths 60. Furthermore, the multiple air flow paths 60 are configured to transfer the air 54 from the flow splitter component 52 into multiple drums 12. Thus, a single flow splitter component 52 may provide the air 54 to multiple drums 12 via the multiple air flow paths 60. Additionally, in some embodiments, each drum 12 may receive the air 54 from two or more air flow paths 60. For example, in the illustrated embodiment, one flow splitter component 52 is coupled to a respective top surface 59 of one drum 12. The flow splitter component 52 includes six air outlets 58 coupled to six corresponding air flow paths 60. The six air flow paths 60 deliver the air 54 to three drums 12, each of the three drums 12 receiving the air 54 from two air flow paths 60. Thus, the one splitter component 52 of FIG. 3 delivers the air 54 to three drums 12. However, any suitable number of flow splitter components 52, air outlets 58, air flow paths 60, and/or drums 12 may be utilized with the harvester 10. By way of example, two flow splitter components 52 may deliver the air 54 to six drums 12. By way of another example, 1, 2, or 3 flow splitter components 52 may be coupled to the harvester 10, and each flow splitter component 52 may be configured to provide the air 54 to 2, 3, 4, 5, 6, or more drums 12 via the air flow paths 60. Furthermore, it should be understood that the air flow paths 60 may have any suitable form for transferring the air 54 from the flow splitter component 52 into the drum 12.

Figure 3:
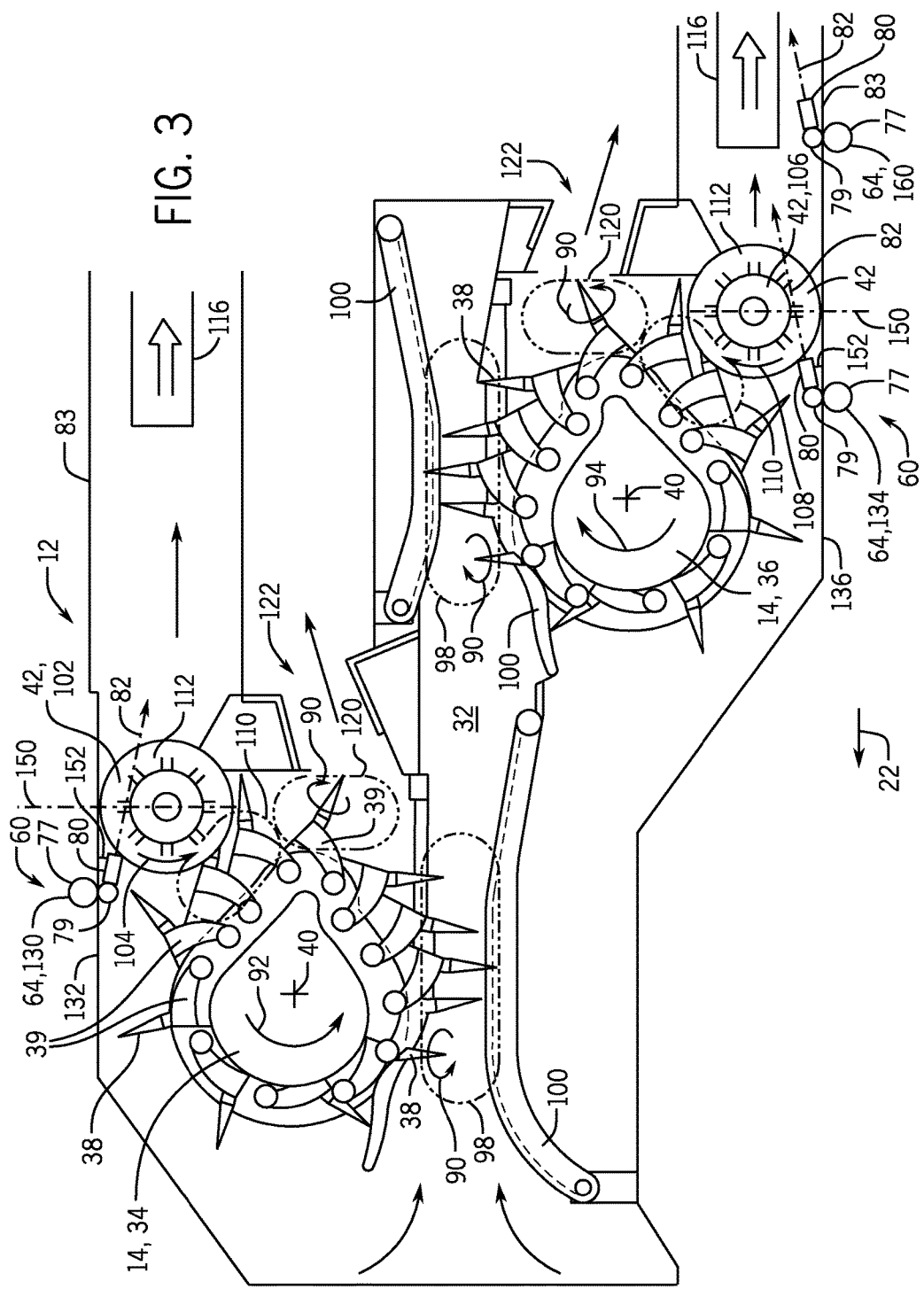
FIG. 3 is a cross-sectional view of one of the multiple drums of FIG. 2, taken along line 3-3.

FIG. 3 is a cross-sectional view of one of the drums 12 of FIG. 2, taken along line 3-3. For conciseness, the embodiments discussed below and illustrated in FIG. 3 relate to portions of a cotton harvester. However, presently contemplated embodiments are not limited to cotton harvesters, and include air systems 50 for other agricultural equipment (e.g., corn head, grain combine, and so forth). As may be appreciated, the air system 50 described herein may be utilized with harvesters for other crops (e.g., wheat, corn, sugar cane, etc.). Additionally, each drum 12 of the harvester 10 may have the same components and features of the drum 12 shown in FIG. 3. As shown, the drum 12 may have one or more rotors 14 (e.g., 2, 3, 4, 5, or 6 rotors), each of which is configured to remove cotton from bolls in a respective row of cotton plants as the harvester 10 travels across the field. In the illustrated embodiment, the drum 12 has a front rotor 34 and a rear rotor 36 spaced apart along the axial axis 26. As shown, the front rotor 34 and the rear rotor 36 are disposed on opposite lateral sides of the crop passage 32.

Each rotor 14 has spindle bars 39 that rotate about the rotational axis 40 to remove the harvested goods (e.g., cotton) from the crops in the crop passage 32. Each spindle bar 39 has a column of spindles 38 that rotate along their respective axes as shown by arrow 90. The rotor 14 moves the spindle bars 39 along the cam path into the crop passage 32. In the crop passage 32, the rotating spindles 38 interact with the crop and remove the cotton from the crop. The cotton may be wound about the spindles 38. In the illustrated embodiment, the spindle bars 39 rotate about the respective rotor 14 in a non-circular (e.g., tear drop or elliptical) cam path. In some embodiments, the spindle bars 39 rotate in a substantially circular path about the rotational axis 40. Each spindle 38 may rotate as shown by arrow 90 to wind the cotton about the spindle 38. The spindle bars 39 rotate around the first rotor 34 in a first direction 92, and around the second rotor 36 in a second direction 94 when the rotors 34, 36 are on opposite lateral sides of the crop passage 32.

In some embodiments, the spindles 38 are coupled to the rotor 14 via cams or the spindle bars 39. The orientation (e.g., angle) of the spindles 38 relative to the rotational axis 40 may change as the spindles 38 rotate about the rotational axis 40 due to the cams or the spindle bars 39. For example, the spindle bars 39 are coupled to the rotor 14 so that the spindles 38 enter the crop passage 32 substantially perpendicularly to the direction of travel 22. Entering a picking zone 98 in the crop passage 32 substantially perpendicular to the direction of travel 22 enables the spindles 38 to pick (e.g., pierce) the cotton boll as the cotton plant passes through the crop passage 32, rather than sweeping through a cotton plant.

The first rotor 34 rotates the spindles 38 in the first direction 92, and the second rotor 36 rotates the spindles 38 in the second direction 94. Rotor guides 100 direct cotton plants toward the picking zone 98 of the crop passage 32. A first doffer 102 rotates in a third direction 104 opposite to the spindles 38 of the first rotor 34 to remove the cotton from the spindles 38, and a second doffer 106 rotates in a fourth direction 108 opposite to the spindles 38 of the second rotor 36 to remove the cotton from the spindles 38. The spindle bars 39 may rotate through the doffers 42 so that the doffers 42 move in the opposite direction relative to the spindles 38 to remove (e.g., unwind) the cotton from the spindles 38. The cotton is removed from the spindles 38 in a doffing zone 110 by each respective doffer 42. In some embodiments, each doffer 42 has a series of stacked discs 112 with circumferential openings to receive the spindles 38. The discs 112 interface with the cotton on the spindles 38 to remove the cotton. The removed cotton is transferred from the doffers 42 to the bin 24 via the harvested goods outlets 83. In some embodiments, a conveyor 116 may move the cotton through the harvested good outlets 83 to the bin 24 (e.g., baler).

Between the picking zone 98 and the doffing zone 110, the spindles 38 rotate through a discharge zone 120. In the discharge zone 120, a first portion (e.g., foliage) of the agricultural product removed by the spindles 38 in the crop passage 32 is discharged through a discharge outlet 122. The first portion may be actively or passively separated from the agricultural product. For example, the cotton may be wound about the spindles 38, and the first portion (e.g., foliage) may be swept through the picking zone 98. The first portion may be swept (e.g., fall) to the discharge outlet 122 to exit the drum 12 as the rotor 14 rotates about the rotational axis 40. The doffers 42 remove the second portion (e.g., cotton) of the harvested product from the spindles 38. The first portion of the agricultural product may include, but is not limited to stems, branches, foliage, detritus, soil, or other agricultural matter that is not primarily the desired harvested good (e.g., cotton). The first portion may be discharged through the discharge outlet 122 directly to the field and/or to a discharge reservoir.

In some embodiments, the zones (e.g., picking zone 98, discharge zone 120, doffing zone 110) discussed herein may overlap and are not necessarily exclusive of one another. For example, the first portion may be discharged from the spindles 38 in the picking zone 98 or the doffing zone 110. In some embodiments, the picking zone 98, the discharge zone 120, and the doffing zone 110 overlap at least in part. Collectively, the zones at least partially surround the rotors 14.

In the illustrated embodiments, posts 64 and discharge outlets 80 are provided to distribute the air 54 into the drum 12. As shown, a first post 130 is disposed on (e.g., extends generally vertically along) a first side wall 132 of the drum 12, and a second post 134 is disposed on (e.g., extends generally vertically along) a second side wall 136 of the drum 12, opposite the first side wall 132. Thus, the first post 130 and the second post 134 are disposed on opposite lateral sides of the drum 12. Each of the posts 64 has a respective air discharge outlet 80 that discharges the air 54 under the doffer 42 and/or toward the harvested goods outlet 83, as shown by arrow 82. As shown, each of the posts 64 has the first portion 77 that is disposed outside the drum 12, and the second portion 79 that is disposed inside the drum 12. The second portion 79 extends between the first portion 77 and the air discharge outlet 80. The post 64 may have the bend 75 where the first portion 77 meets the second portion 79. Maintaining the first portion 77 outside the drum 12 may facilitate coupling and/or removing the post 64 from the frame 72 of the drum 12, while the second portion 79 and the air discharge outlet 80 distribute the air 54 into the drum 12.

As shown, each of the posts 64 are disposed forward of the respective doffer 42 and vertically below the respective doffer 42 such that the air 54 passes under the respective doffer 42 as the air 54 flows toward the respective harvested goods outlet 83. In certain embodiments, the posts 64 and/or the discharge outlets 80 may be positioned in any suitable location to facilitate flow of the harvested goods toward the harvested goods outlet 83. For example, each discharge outlet 80 may be disposed at any suitable location forward of a center line 150 of the respective doffer 42 and/or may be oriented toward the respective harvested goods outlet 83. In some cases, the discharge outlet 80 may be oriented at an angle 152 relative to a respective side wall 132, 126 of the drum 12. For example, the angle 152 may be between approximately 0 to 90 degrees, 5 to 70 degrees, 10 to 60 degrees, 15 to 45 degrees, or 20 to 30 degrees. In some cases, the angle 152 may be approximately 5, 10, 15, 20, 25, 30, or more degrees. In other cases, the discharge outlet 80 may be oriented parallel to the respective side wall 132, 136 such that the air 54 is discharged generally parallel to the direction 22 of travel of the harvester 10 and the axial axis 26 of the drum 12. Thus, the discharge outlets 80 may have any suitable shape or configuration that enables distribution of the air 54 under the doffers 42 and/or toward the harvested goods outlets 83. For example, in some cases, the discharge outlets 80 may extend axially 26, laterally 28, and/or vertically 30 from the posts 64 that are coupled to the side walls 132, 136 of the drum 12. It should be understood that in other embodiments, the posts 64 may be inserted into the drum 12 at a location away from the side wall 132, 136 of the drum 12 and may be coupled to other components within the drum 12. Additionally, one or more additional posts 64 may be coupled to the drum 12 in any suitable location. For example, as shown, a third post 160 is disposed proximate the harvested goods outlet 83 to facilitate flow of the harvested goods toward the conveyor 116.

Figure 4:
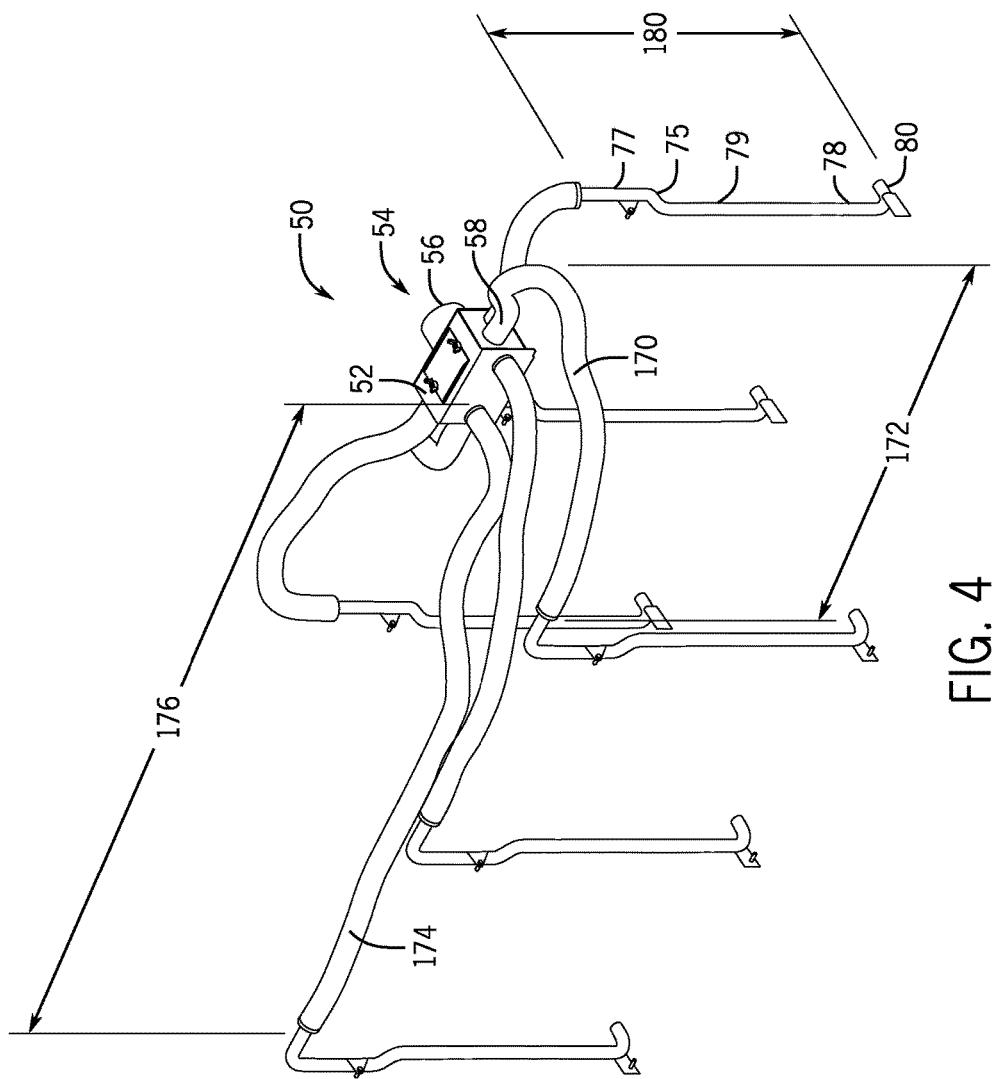
FIG. 4 is a perspective view of an embodiment of an air system configured for use with a harvester.

FIG. 4 is a perspective view of an embodiment of the air system 50 configured for use with the harvester 10. As shown, the air system 50 includes the flow splitter component 52 having the air inlet 56 and multiple air outlets 58. Each of the multiple air flow paths 60 is coupled to a respective one of the multiple air outlets 58 to flow the air 54 into the drum 12, as discussed above. Each of the air flow paths 60 includes the hose 62 and the post 64, which are coupled together, such as by the threaded coupling 66. The hoses 62 may be flexible and/or resilient, and the various hoses 62 of the air system 50 may have different lengths. For example, a first hose 170 may have a first length 172, and a second hose 174 may have a second length 176, different from the first length 172, to enable the first hose 170 and the second hose 174 to extend to different drums 12 of the harvester 10.

The posts 64 may be rigid and may be configured to extend generally orthogonally from the hoses 62. As shown, each of the posts 64 has the bend between the first portion 77 and the second portion 79 of the post 64. Additionally, the air discharge outlet 80 is disposed at the second end 78 of the post 64. The post 64 may have a post length 180 that enables the air discharge outlet 80 to discharge the air 54 under the doffer 42 (shown in FIG. 2). The air discharge outlet 80 may be generally orthogonal to the second portion 78 of the post 64. As discussed above, the air system 50 is configured to be used with the harvester 10. Thus, the air system 50 may be positioned on the drums 12 of the harvester as shown in FIG. 2, for example. As discussed above, the flow splitter component 52 may be positioned on one of the drums 12 of the harvester 10, and the air flow paths 60 may be arranged to transfer the air 54 from the flow splitter component 52 into multiple drums 12, such as into 1, 2, 3, 4, 5, 6, or more drums.

Additionally, as discussed above, the air system 50, or the components therein (e.g., the hoses 62 and/or the posts 64) may be configured to be retrofitted to an existing drum 12 and/or to be removably coupled to the drum 12. In some embodiments, the air system 50 may be removed as a whole (e.g., the flow splitter component 52 and the air flow paths 60). In certain embodiments, one or more components of the air system 50 may be separable from the other components of the air system 50 and/or removable from the harvester 10. For example, the posts 62 and/or the discharge outlets 80 may be separable from both the hoses 62 and the drum 12. In such cases, the posts 62 and/or the discharge outlets 80 may be easily removed for cleaning, inspection, maintenance, replacement, or the like, while the flow splitter box 52 and/or the hoses 62 remain coupled to the harvester 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An air system for an agricultural harvester, comprising:
an air flow splitter component configured to be coupled to the agricultural harvester, the air flow splitter component comprising an inlet configured to receive air and a plurality of air outlets configured to distribute the air; and
a plurality of air flow paths, wherein a first air flow path of the plurality of air flow paths extends from a respective one of the plurality of air outlets and is configured to extend to a corresponding drum of the agricultural harvester, the first air flow path of the plurality of air flow paths comprises a respective discharge outlet configured to discharge the air between a bottom surface of the corresponding drum and a respective bottom disc of a first doffer of the corresponding drum while the air system is coupled to the agricultural harvester, and the first air flow path comprises a rigid conduit having a bend that enables a first portion of the rigid conduit to extend along an external surface of a first lateral side wall of the corresponding drum and that enables a second portion of the rigid conduit to be positioned internal to the first lateral side wall of the corresponding drum while the air system is coupled to the agricultural harvester.

2. The air system of claim 1, wherein the first air flow path of the plurality of air flow paths comprises a flexible conduit extending from the respective one of the plurality of air outlets to the rigid conduit.

3. The air system of claim 1, wherein the rigid conduit is configured to be removably coupled to the corresponding drum via at least one threaded fastener.

4. The air system of claim 1, wherein the air flow splitter component and the plurality of air flow paths are configured to be removably coupled to the agricultural harvester via at least one threaded fastener.

5. The air system of claim 1, wherein the air system comprises only one air flow splitter component, and the plurality of air flow paths comprises the first air flow path and at least three additional air flow paths coupled to the air flow splitter component and configured to deliver the air to the corresponding drum and at least one additional drum of the agricultural harvester.

6. The air system of claim 1, wherein each of the plurality of air flow paths comprises a flexible conduit, and at least some of the flexible conduits of the plurality of air flow paths have different lengths to facilitate distribution of the air to the corresponding drum and another drum of the agricultural harvester.

7. The air system of claim 1, comprising a second air flow path of the plurality of air flow paths that extends from a respective one of the plurality of air outlets and is configured to extend to the first drum of the agricultural harvester, and a third air flow path of the plurality of air flow paths that extends from a respective one of the plurality of air outlets and is configured to extend to another drum of the agricultural harvester, wherein the corresponding drum and the another drum each comprise a first rotor and a second rotor, a first spindle bar driven to rotate by the first rotor, and a second spindle bar driven to rotate by the second motor to remove portions of a crop as the agricultural harvester travels through a field.

8. The air system of claim 1, comprising a second air flow path of the plurality of air flow paths that extends from a respective one of the plurality of air outlets and is configured to discharge the air between the bottom surface of the corresponding drum and a respective bottom disc of a second doffer of the corresponding drum while the air system is coupled to the agricultural harvester, and comprising a third air flow path of the plurality of air flow paths that extends from a respective one of the plurality of air outlets and is configured to discharge the air along the bottom surface proximate to a harvested goods outlet while the air system is coupled to the agricultural harvester.

9. The air system of claim 1, wherein the respective discharge outlet of the first air flow path is oriented toward a harvested goods outlet of the corresponding drum.

10. The air system of claim 1, wherein a second air flow path of the plurality of air flow paths extends from a respective one of the plurality of air outlets and is configured to extend to the corresponding drum of the agricultural harvester, the second air flow path of the plurality of air flow paths comprises a respective discharge outlet configured to be disposed between the bottom surface of the corresponding drum and a respective bottom disc of a second doffer of the corresponding drum while the air system is coupled to the agricultural harvester, and the first doffer and the second doffer are positioned between the respective discharge outlet of the first air flow path and the respective discharge outlet of the second air flow path along a lateral axis of the corresponding drum.

11. The air system of claim 10, wherein the second air flow path comprises a respective rigid conduit having a respective bend that enables a respective first portion of the respective rigid conduit to extend along a respective external surface of a second lateral side wall of the corresponding drum and that enables a respective second portion of the respective rigid conduit to be positioned internal to the second lateral side wall of the corresponding drum while the air system is coupled to the agricultural harvester.

12. An air system for an agricultural harvester, comprising:
    an air flow splitter component configured to be supported on a first drum of the agricultural harvester, the air flow splitter component comprising an inlet configured to receive air and a plurality of air outlets configured to distribute the air;
    a plurality of air flow paths, a first air flow path of the plurality of air flow paths extending from a respective one of the plurality of air outlets to distribute the air to the first drum of the agricultural harvester and a second air flow path of the plurality of air flow paths extending from a respective one of the plurality of air outlets to distribute air to a second drum of the agricultural harvester.

13. The air system of claim 12, wherein the first air flow path of the plurality of air flow paths has a first length sufficient to facilitate discharge of the air below a respective doffer of the first drum, and the second air flow path of the plurality of air flow paths has a second length sufficient to facilitate discharge of the air below a respective doffer of the second drum.

14. The air system of claim 12, wherein the air flow splitter component and the plurality of air flow paths are configured to be removably coupled to the agricultural harvester via at least one threaded fastener.

15. The air system of claim 12, wherein the first air flow path comprises a rigid conduit having a bend that enables the rigid conduit to pass through a first lateral side wall of the first drum such that a first portion of the rigid conduit is positioned external to the first lateral side wall of the first drum and a second portion of the rigid conduit is positioned internal to the first lateral side wall of the first drum while the air system is coupled to the agricultural harvester.

16. The air system of claim 12, wherein the first drum and the second drum each comprise a first rotor and a second rotor, a first spindle bar driven to rotate by the first rotor, and a second spindle bar driven to rotate by the second motor to remove portions of a crop as the agricultural harvester travels through a field.

17. An agricultural harvester, comprising:
    a first drum configured to receive and to process a crop as the agricultural harvester travels across a field;
    an air system coupled to the first drum, comprising:

an air flow splitter component comprising an inlet configured to receive air and a plurality of air outlets configured to distribute the air;

a plurality of air flow paths, a first air flow path of the plurality of air flow paths extending from a respective one of the plurality of air outlets to the first drum, the first air flow path of the plurality of air flow paths comprising a respective discharge outlet configured to discharge the air under a first doffer of the first drum, a second air flow path of the plurality of air flow paths extending from a respective one of the plurality of air outlets to the first drum, the second air flow path of the plurality of air flow paths comprising a respective discharge outlet configured to discharge the air under a second doffer of the at first drum, and the first doffer and the second doffer are positioned between the respective discharge outlets of the first air flow path and the second air flow path along a lateral axis of the first drum.

18. The agricultural harvester of claim 17, wherein the first air flow path of the plurality of air flow paths comprises:

a flexible conduit configured to extend across a top surface of the first drum; and a rigid conduit coupled to the flexible conduit and having a length that enables the rigid conduit to extend vertically along a lateral side wall of the first drum and to discharge the air under the first doffer of the first drum, wherein the rigid conduit comprises a bend that enables a first portion of the rigid conduit to extend along an external surface of the first lateral side wall of the first drum and that enables a second portion of the rigid conduit to be positioned internal to the first lateral side wall of the first drum.

19. The agricultural harvester of claim 17, comprising a third air flow path of the plurality of air flow paths extending from a respective one of the plurality of air outlets to a second drum.

20. The agricultural harvester of claim 17, wherein the first air flow path comprises a first rigid conduit that extends vertically along a first lateral side wall of the first drum and a second rigid conduit that extends vertically along a second lateral side wall of the first drum, the first rigid conduit comprises a respective bend that enables a respective first portion of the first rigid conduit to extend along a respective external surface of the first lateral side wall and a respective second portion of the second rigid conduit to be positioned internal to the first lateral side wall, and the second rigid conduit comprises a respective bend that enables a respective first portion of the second rigid conduit to extend along a respective external surface of the second lateral side wall and a respective second portion of the second rigid conduit to be positioned internal to the second lateral side wall.

* * * * *